United States Patent
Chen

(10) Patent No.: US 6,666,356 B2
(45) Date of Patent: Dec. 23, 2003

(54) GREASE GUN WITH A ROTARY OIL INJECTION TUBE

(75) Inventor: Tuz-Fen Chen, Taipei (TW)

(73) Assignee: Shinnyi Technology Co., Ltd., Tao Yuan (TW)

( * ) Notice: Subject to any disclaimer, the term of this patent is extended or adjusted under 35 U.S.C. 154(b) by 66 days.

(21) Appl. No.: 10/059,216

(22) Filed: Jan. 31, 2002

(65) Prior Publication Data

US 2003/0141319 A1 Jul. 31, 2003

(51) Int. Cl.[7] ................................................. F16N 3/12
(52) U.S. Cl. ........................................ 222/256; 222/533
(58) Field of Search ................................. 222/256, 262, 222/263, 533, 536

(56) References Cited

U.S. PATENT DOCUMENTS

| | | | | |
|---|---|---|---|---|
| 1,534,173 A | * | 4/1925 | Fogelberg | 222/533 |
| 1,705,443 A | * | 3/1929 | Edelmann | 222/533 |
| 1,758,250 A | * | 5/1930 | Davis | 222/256 |
| 1,761,127 A | * | 6/1930 | Jacques | 222/256 |
| 1,931,122 A | * | 10/1933 | Zerk | 222/256 |
| 2,612,296 A | * | 9/1952 | Campbell et al. | 222/256 |
| 2,773,630 A | * | 12/1956 | Mascher et al. | 222/256 |
| 2,886,215 A | * | 5/1959 | Klein et al. | 222/256 |

* cited by examiner

*Primary Examiner*—Kenneth Bomberg
(74) *Attorney, Agent, or Firm*—Varndell & Varndell, PLLC

(57) ABSTRACT

A grease gun with a rotary oil injection tube comprises an oil storage tank, a valve seat, an oil injection tube and a press rod. The oil storage tank is hollow round cylinder with an opening in the front end. The oil storage tank serves to store grease. The press rod is a long rod pivotally installed to one side of the valve seat. The user can press the press rod for extruding grease. The valve seat is formed at a front end of the oil injection tube and the front surface thereof is installed with a tilt surface. The tilt surface is formed with a tilt through hole which is communicated with the oil storage tank. Thereby, the rotary seat of the oil injection tube can pass through the tilt through hole and is communicated with the tilt through hole. Thereby, a grease gun with a rotary oil injection tube is formed.

7 Claims, 8 Drawing Sheets

# GREASE GUN WITH A ROTARY OIL INJECTION TUBE

BACKGROUND OF THE INVENTION (a) Field of the Invention

The present invention relates to a grease gun with a rotary oil injection tube, and particularly to a grease gun for injecting grease, which has a rotary seat so that the user may user it conveniently.

(b) Description of the Prior Art

The prior art grease gun is used to inject grease into a mechanic structure but the user will not contact the grease. FIG. 1 shows a prior art grease gun which includes an oil storage tank 10, a check valve 20, two press rods 30 and an oil injection tube 40. Thereby, the hollow oil storage tank 10 may be filled with grease. When a user presses the press rod 30, the grease can be injected into the mechanic structure through the check valve 10 and the oil injection tube 40.

However, for the structure illustrated in FIG. 1, the oil injection tube 40 is transversally installed to one side of the check valve 20, while the structure necessary grease has often a complex structure so that the oil injection tube 40 can be inserted into the structure from a proper angle. This is because that the oil injection tube cannot move. Although in one prior art structure, a front end of the check valve 20 is formed with an inserting hole. Thereby, the user may insert the oil injection tube 40 to a front end (referring the dashed line in FIG. 1) so that the user may use it conveniently. However, the orientation of the oil injection tube 40 may change only a little angle.

To fill grease easily in a complicated structure, in one prior art, a soft oil injection tube 40 is installed in the grease gun (referring to FIG. 2) so that the oil injection tube may rotate through any desired angle. Since the oil injection tube has a soft structure and thus the user must hold the oil inlet by another hand. If the oil inlet is formed at a slightly inner side of the mechanic structure, then the user's hand can not insert into the structure to hole it, namely the oil injection tube can not be used in this general condition.

SUMMARY OF THE INVENTION

According to the primary object of the present invention is to provide a grease gun with a rotary oil injection tube comprising an oil storage tank, a valve seat, an oil injection tube and a press rod.

The oil storage tank is hollow round cylinder with an opening in the front end. The oil storage tank serves to store grease. The press rod is a long rod pivotally installed to one side of the valve seat. The user can press the press rod for extruding grease. The valve seat is formed at a front end of the oil injection tube and the front surface thereof is installed with a tilt surface. The tilt surface is formed with a tilt through hole which is communicated with the oil storage tank. Thereby, the rotary seat of the oil injection tube can pass through the tilt through hole and is communicated with the tilt through hole. Thereby, a grease gun with a rotary oil injection tube is formed.

Another object of the present invention is to provide a grease gun with a rotary oil injection tube, wherein the tilt surface of the rotary seat of the oil injection tube is installed with at least one blind hole. An elastic element and a steel ball is installed. A plurality of concave holes are formed at the tilt surface at a front end of the valve seat. When the rotary seat is assembled to the tilt surface of the valve set, the elastic element will eject the steel ball into one of the concave holes so that the oil injection tube can be positioned by the steel ball.

DETAILED DESCRIPTION OF THE PREFERRED EMBODIMENTS

Figure 1:
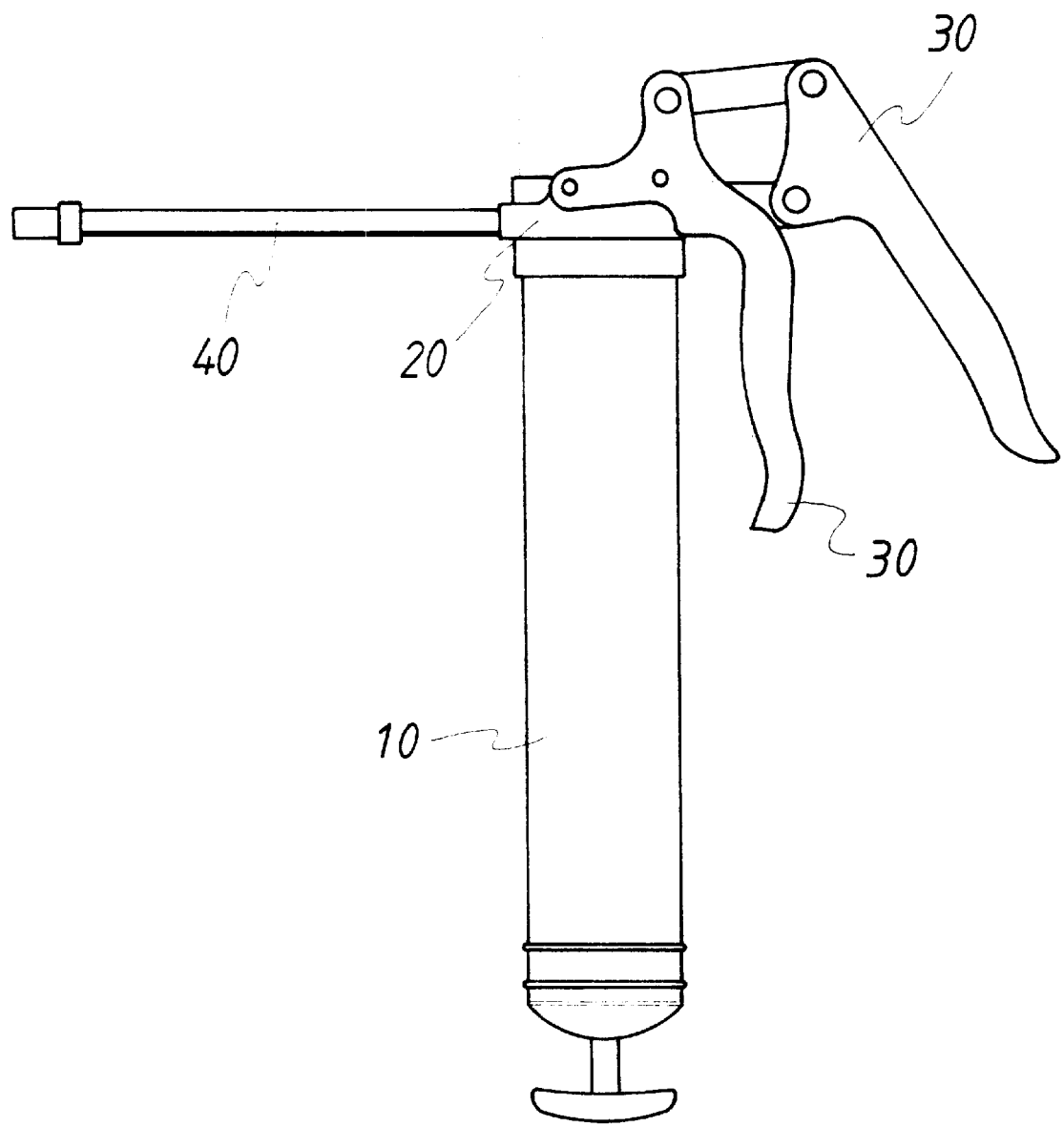
FIG. 1 is a schematic view showing the prior art grease gun with a hard oil injection tube.
Figure 2:
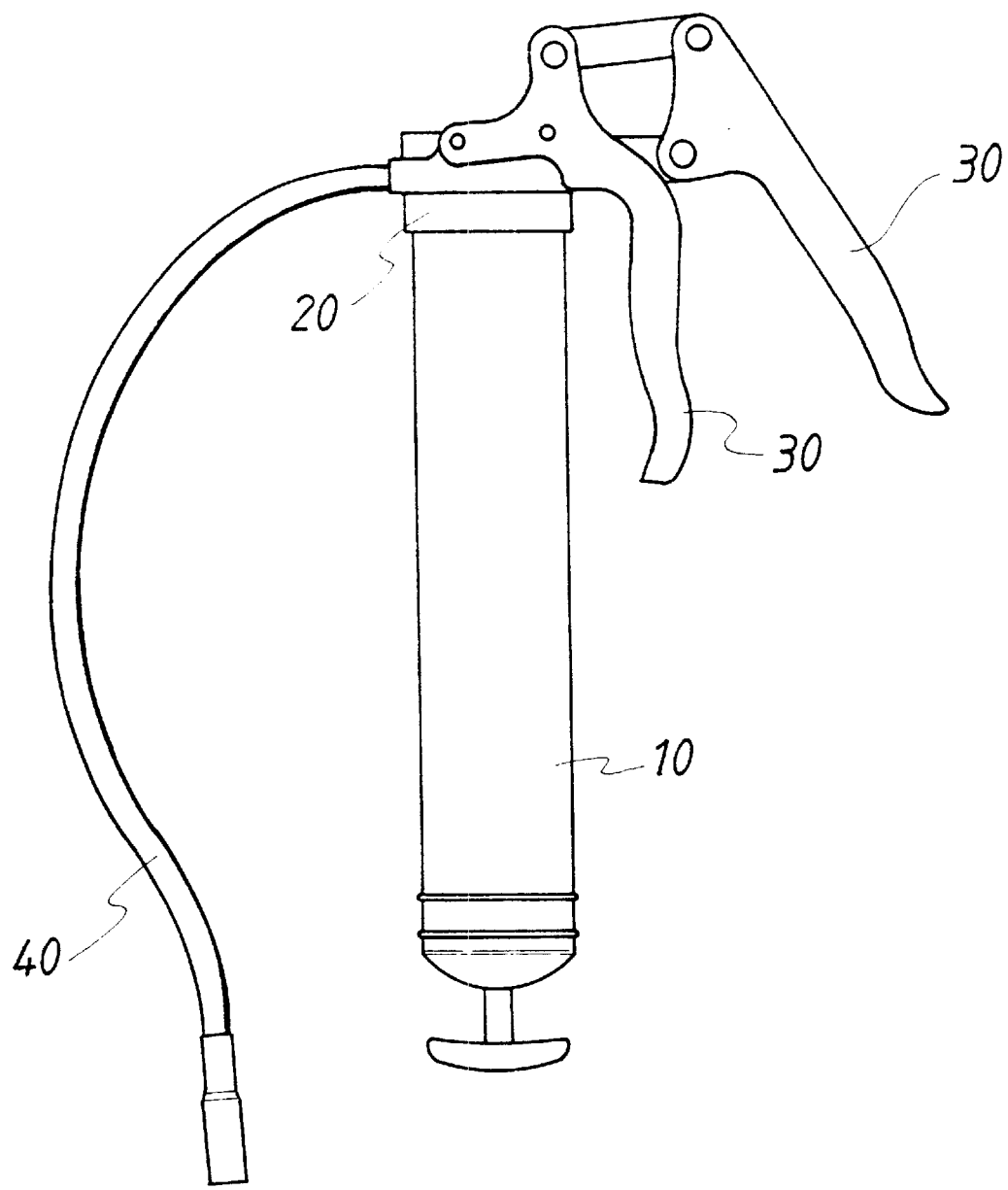
FIG. 2 is a schematic view of the prior art grease gun with a soft oil injection tube.
Figure 3:
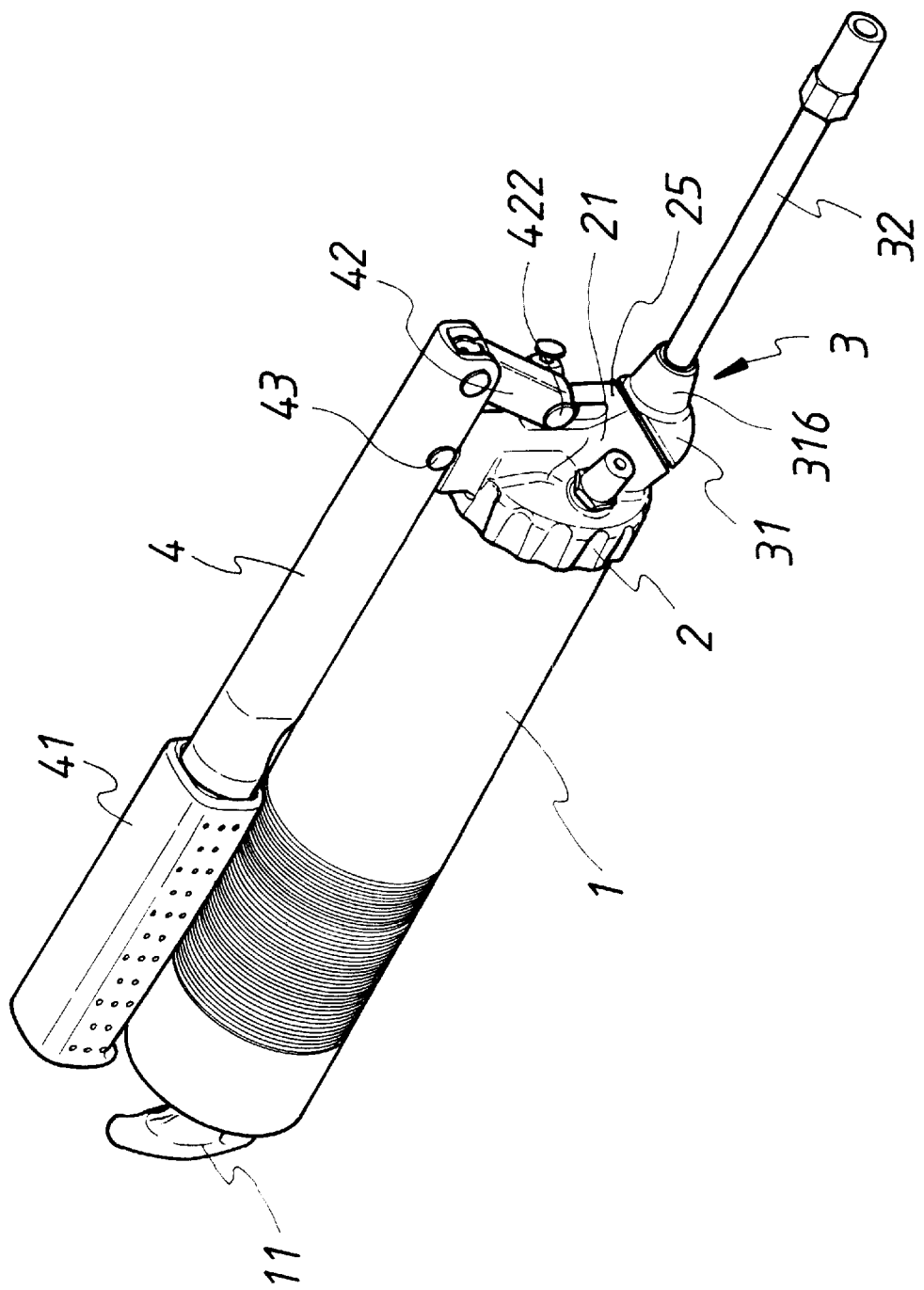
FIG. 3 is an assembled perspective view of the present invention.
Figure 4:
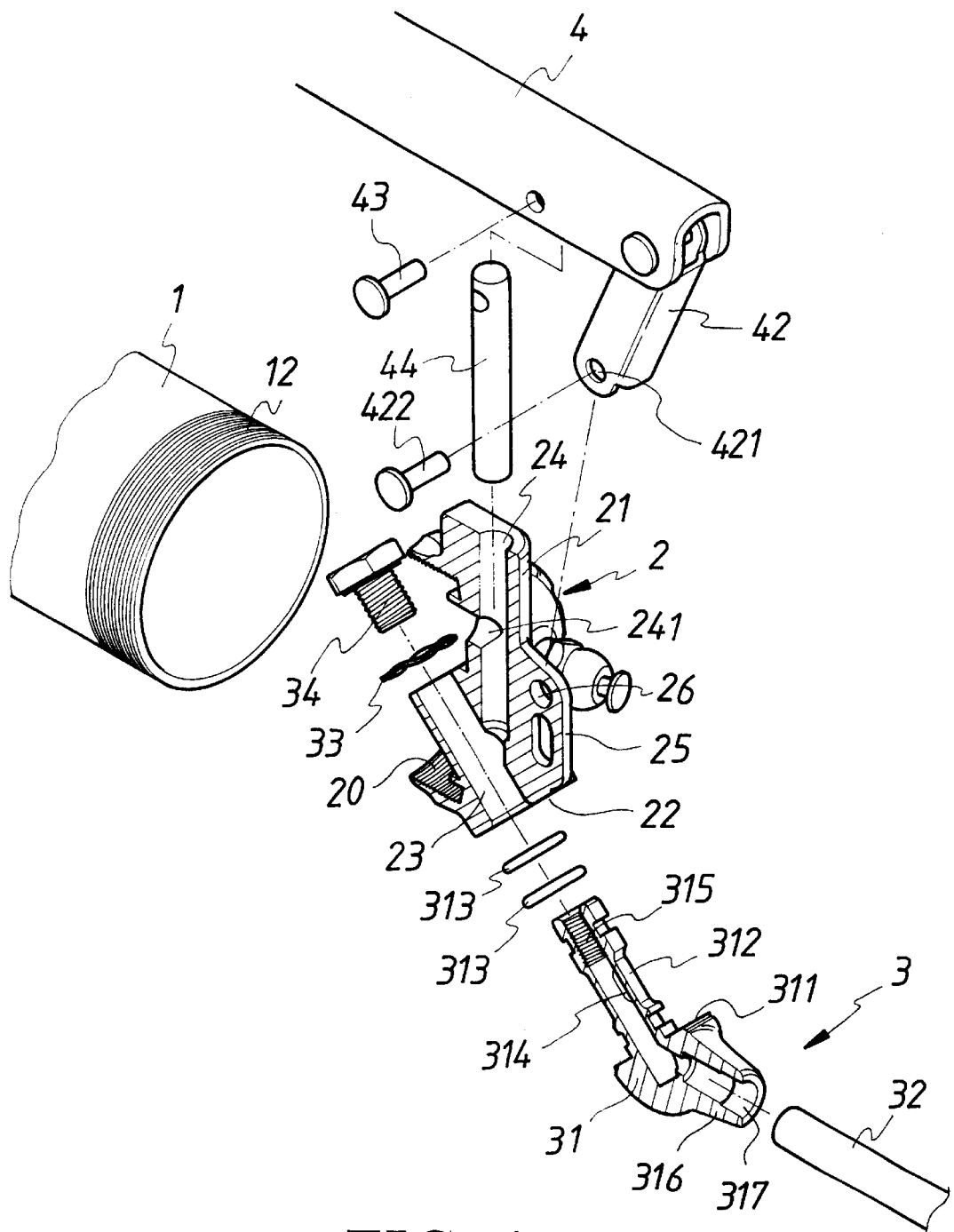
FIG. 4 is a partial perspective view of the present invention.
Figure 5:
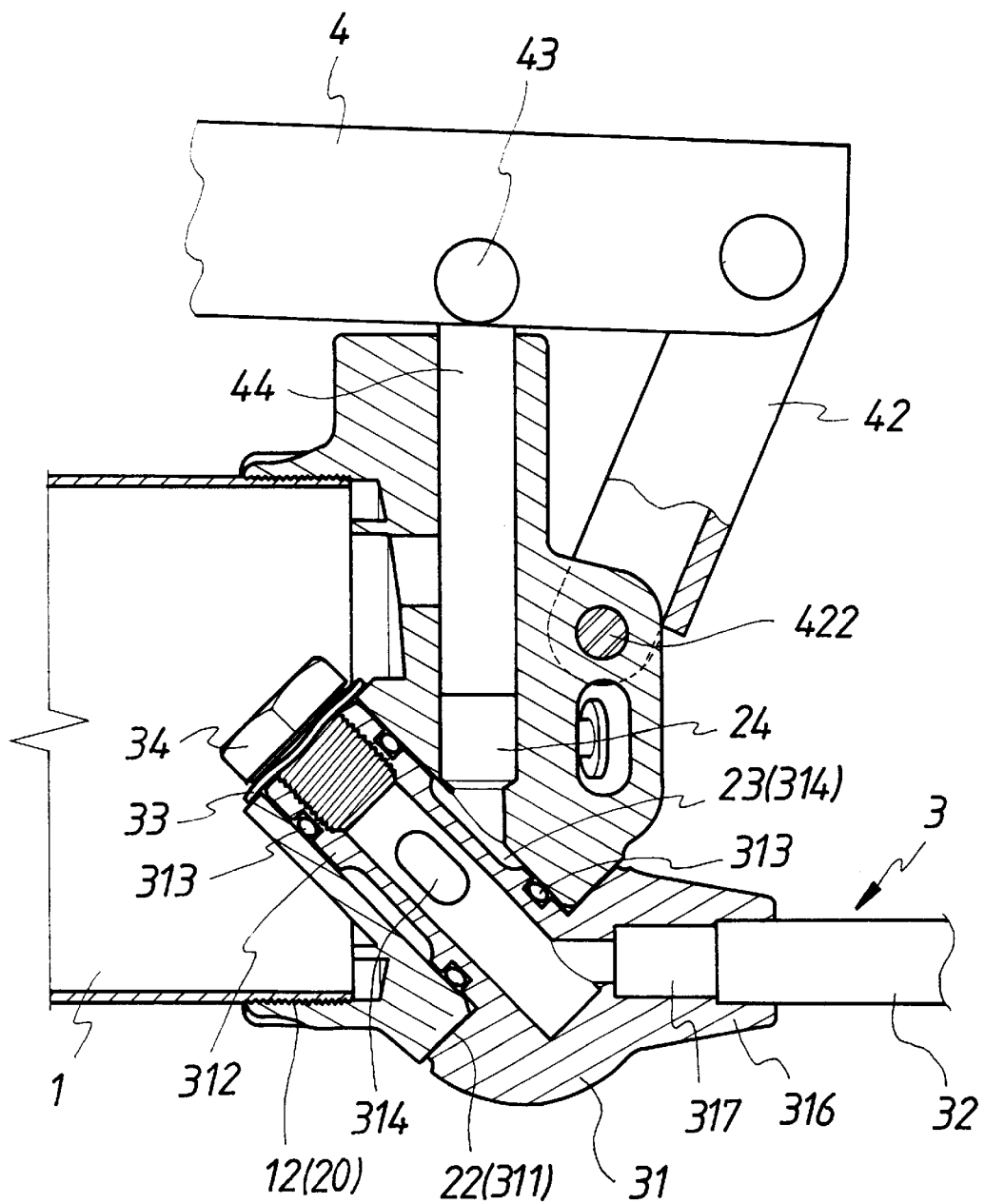
FIG. 5 is a partial cross section view showing the assembled condition of the present invention.

Referring to FIGS. 3, 4, and 5, the grease gun with a rotary oil injection tube of the present invention is illustrated. The grease gun with a rotary oil injection tube includes an oil storage tank 1, a valve seat 2, an oil injection tube 3 and a press rod 4.

The oil storage tank 1 is a hollow round cylinder with an opening in the front end and an extruding rod 11 at a rear end. An outer threaded section 12 is installed at a front periphery. Thereby, it can be screwed with the valve seat 2. The oil used is grease.

The valve seat 2 is a U-like cover. An inner edge of the rear end of the cover is installed with an inner threaded section 20 for screwing with the oil storage tank 1. A front end thereof is installed with a block 21. A front lower end of the block 21 is installed with a 45 degree round tilt surface 22. A tilt through hole 23 is formed at a predetermined position of the tilt surface 22 for being communicated with the interior thereof. An upper side of the block 21 is installed with a piston hole 24 which is intersected and communicated with the piston hole 23. A stub hole 241 of the piston hole 24 is communicated with a rear side of the valve seat 2. A front end of the block 21 is installed with an ear 25. The ear 25 has a pivotal hole 26 which is a transversal through hole for installing the press rod 4.

The oil injection tube 3 is formed by a rotary seat 31, a round tube 32, an elastic washer 33, a stud 34, etc. The rotary seat 31 is a semispherical structure and a plurality of O rings are installed at a periphery thereof. The middle section of the shaft 312 of the round tube has a plurality of radial through holes 314, and an inner threaded section 315 is installed in the rear section. A front end of the rotary seat 31 has a post 316. An middle section of the post 316 has an inserting hole 317 which is communicated with an interior of the shaft 312. Thereby, a round tube 32 can be inserted into the inserted hole 317. The elastic washer 33 has a wave-like shape and is locked to a rear end of the shaft 312 of the rotary seat 31.

The press rod 4 is a long rod for being pressed and extruded. The rear section of the rod is installed with a handle cover 41 and a front section thereof is pivotally installed with a supporting rod 42 of U shape which is extended to the lower side. A distal end of the supporting rod 42 is installed with a pivotal hole 421 which is penetrated by a pivotal shaft 422. The body of the press rod 4 at a rear side of the supporting rod 42 is pivotally installed with a plug shaft 44 by a pin 43. Thereby, an oil extruding structure by the press rod 4 and valve seat 2 is formed.

Referring to FIGS. 4, and 5, the U shape supporting rod 42 at the lower side of the press rod 4 is engaged with the ear 25 of the valve seat 2. The pivotal shaft 422 passes through the pivotal hole. The piston shaft 44 is inserted into the piston hole 24 in the block 21. Thereby, the press rod 4 is located at an upper side of the valve seat 2 and is formed as a structure for extruding oil. The shaft 312 at a rear end of the oil injection tube 3 passes through the tilt through hole 23 of the valve seat 2. The stud 34 at the rear end thereof passes through the elastic washer 33 and then is firmly secured to the inner threaded section 315 so that the elastic washer 33 exactly resists against the rear ends of the shaft 312 and the valve seat 2. The oil injection tube 3 is assembled to the tilt surface 22 to be as a rotationable structure. If the inner threaded section 20 is screwed to the front end of the oil storage tank 1, and the outer threaded section 12 is sealed. Then the grease gun with a rotary oil injection tube of the present invention is formed.

Figure 6:
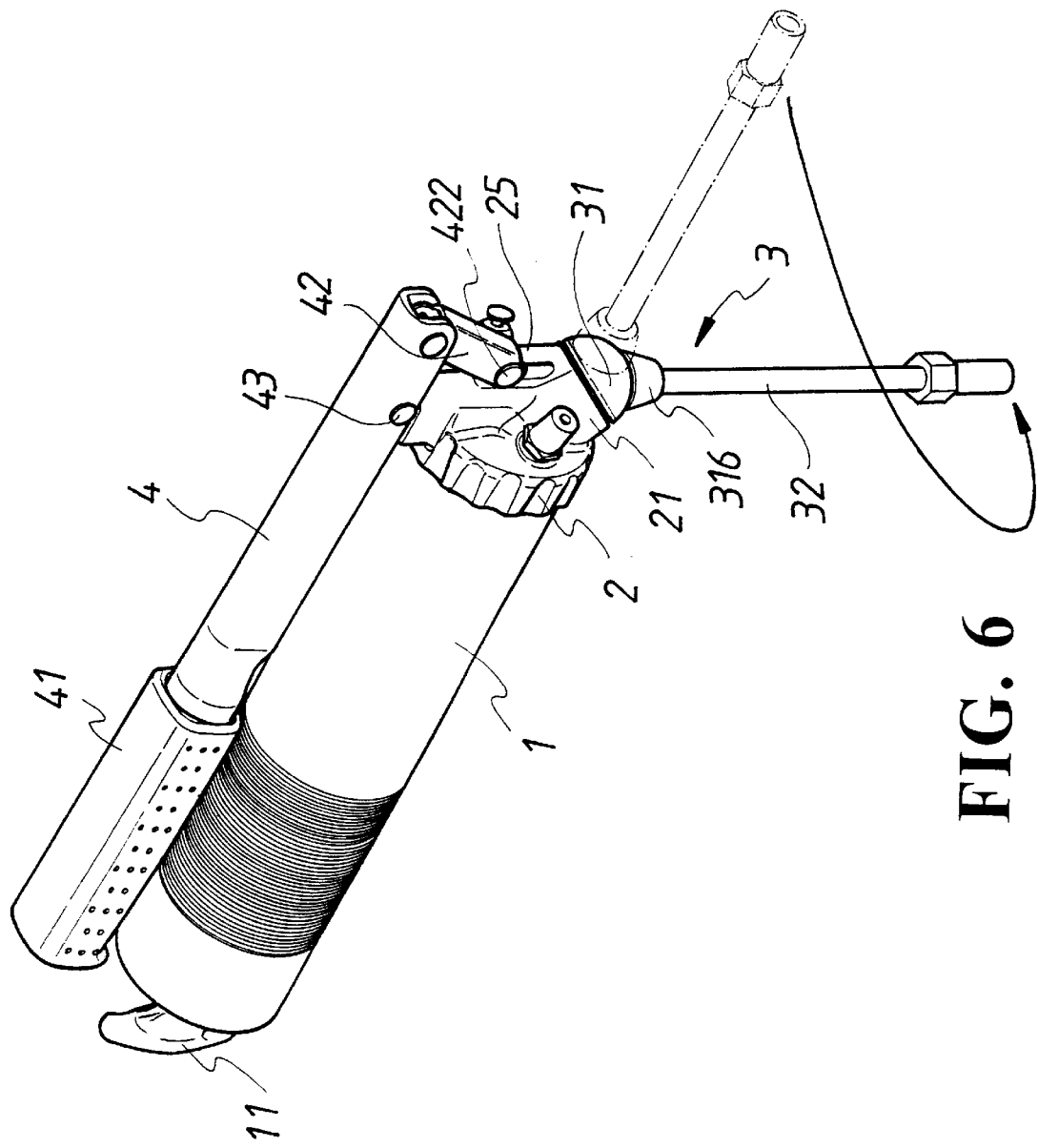
FIG. 6 is a schematic view showing the operation of oil injection tube of the present invention.

By the grease gun with a rotary oil injection tube of the present invention, in injecting grease, the rear extruding rod 11 of the oil storage tank 1 extrudes the grease to move forwards so that the grease flows into the piston hole 24 through the stub hole 241. If the press rod 4 is pressed so that the piston shaft 44 moves forwards. Then the grease moves through the via hole 314 of the cylinder shaft 312, interior of the cylinder shaft 312, the inserting hole 317 and the round tube 32 to inject into a predetermined portion. The function is that as using the oil injection tube 3, the orientation can be changed (referring to FIG. 6). Since the tilt surface 22 of the valve seat 2 has a 45 degrees angle with respect to the tilt surface 311 of the rotary seat 31. The oil injection tube 3 can be rotated to transversally extend to one side of the grease gun, or is rotated to axially extend to a front end of the grease gun (as indicated by the dashed line of FIG. 6), or other predetermined angle. Thereby, the user may adjust the oil injection tube 3 for injecting grease. As a result, the defect in the prior art can be improved. The soft oil injection tube is unnecessary to be held.

Figure 7:
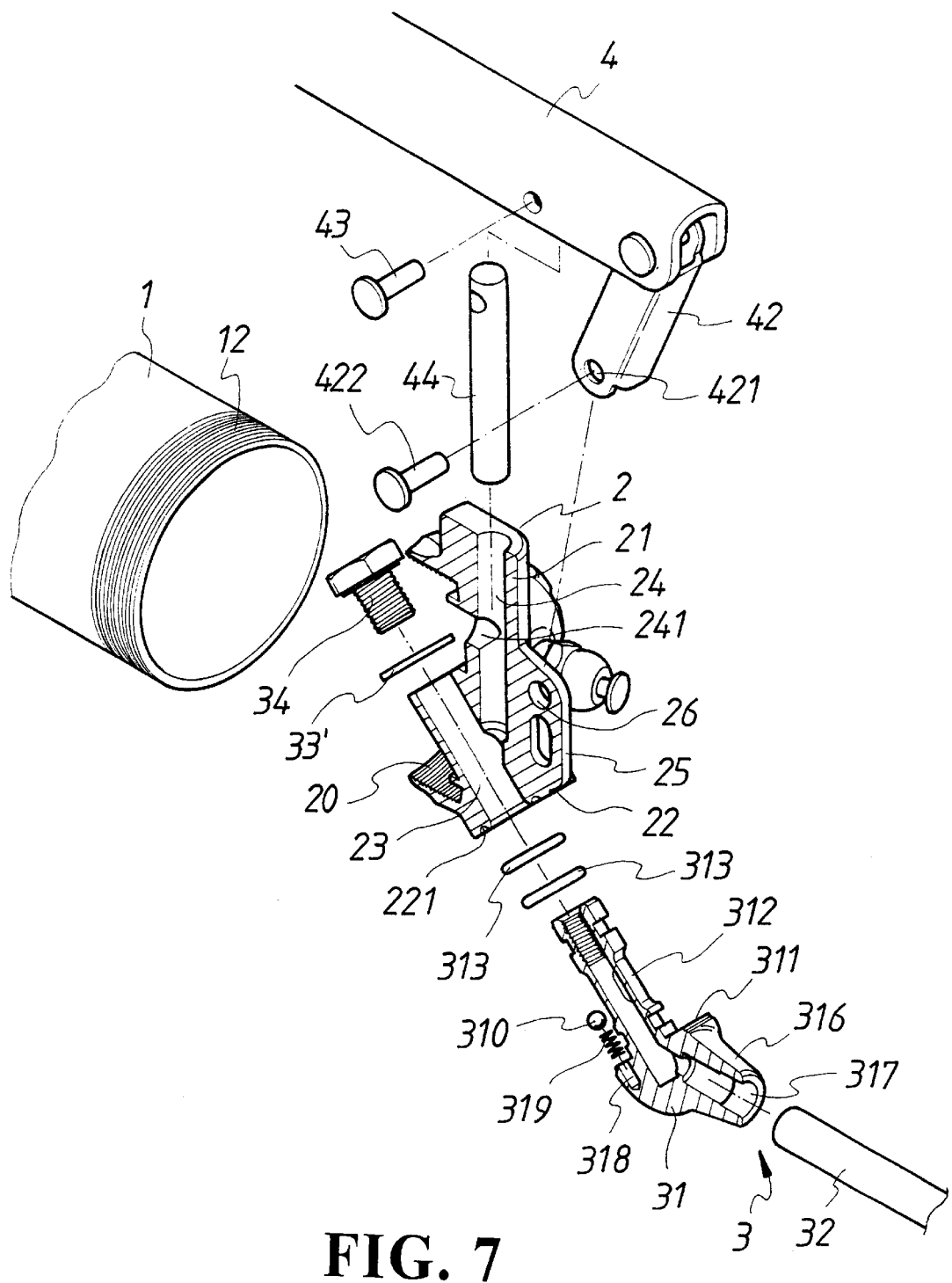
FIG. 7 is an exploded perspective view of another embodiment of the present invention.
Figure 8:
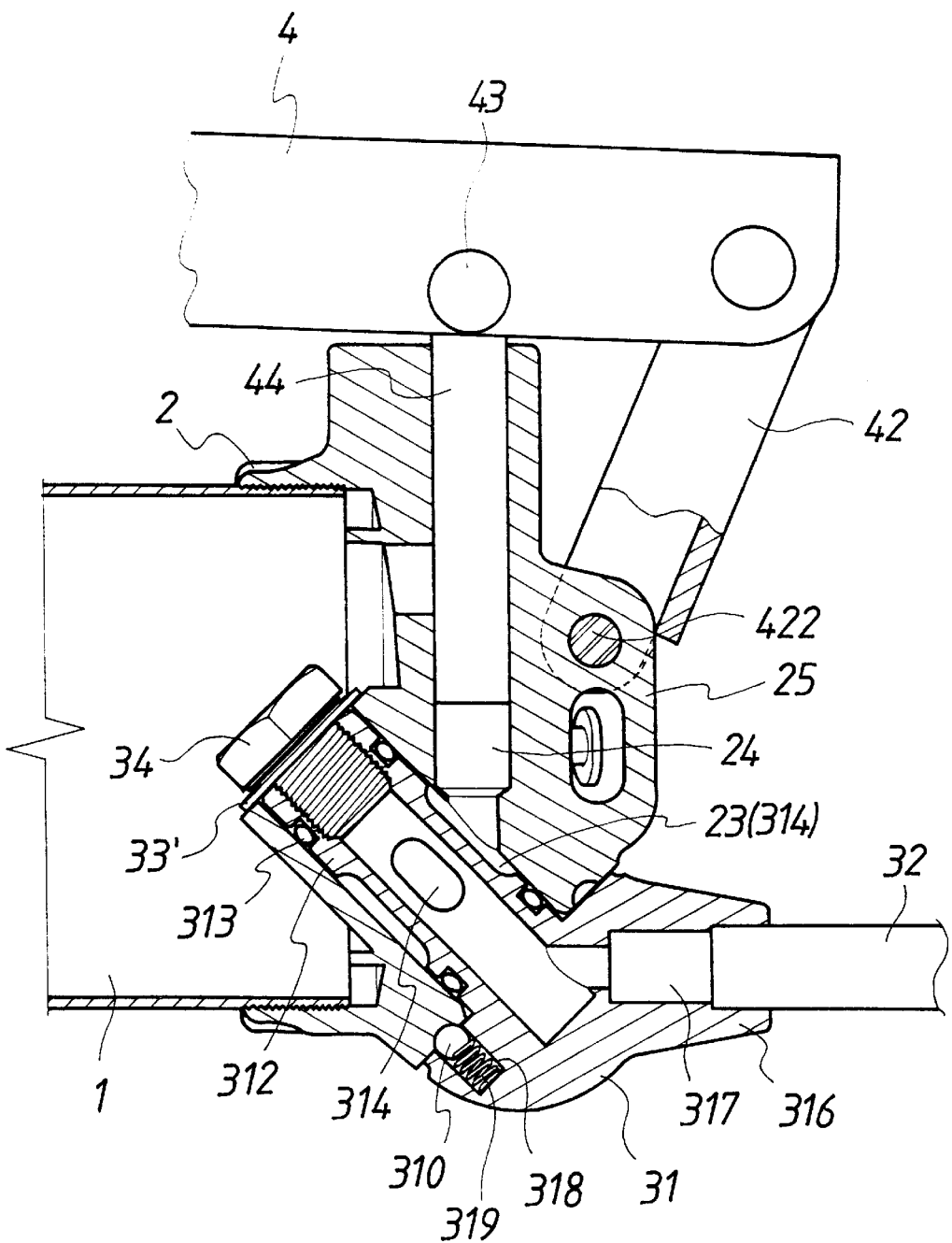
FIG. 8 is an assembled cross section view of another embodiment of the present invention.

About disclosed structure is only one preferred embodiment of the present invention, while is not used to confine the scope and spirit of the present invention. Other modifications and variations are usable in the present invention. With reference to FIGS. 7 and 8, in this embodiment, the tilt surface 311 of the rotary seat 31 of the oil injection tube 3 is installed with at least one blind hole 318. Thereby, an elastic element 319 and a steel ball 310 can be installed. A plurality of concave holes 221 are formed at the tilt surface 22 at a front end of the valve seat 2. When the rotary seat 31 is inserted into the tilt through hole 23 of the valve seat 2 by the cylinder shaft 312, by a stud 34 to pass through the washer 33' and is screwed to the interior threaded section 315, the rotary seat 31 can be assembled to the tilt surface 22 of the valve seat 2. Then the elastic element 319 resists against the steel ball 310 to enter into the concave holes 221. Thereby, as the oil injection tube 3 rotates, it can be positioned by the steel ball 310. However, all the embodiments for matching the tilt surface 22 of the valve seat 2 and the tilt surface 311 of the oil injection tube 3 so that the orientation of the oil injection tube 3 is changed is within the scope of the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A grease gun with a rotary oil injection tube comprising an oil storage tank, a valve seat, an oil injection tube and a press rod; the oil storage tank being a hollow round cylinder with an opening in the front end, the oil storage tank serving to store grease; the press rod being a long rod pivotally installed to one side of the valve seat; the user can press the press rod for extruding grease; characterized in that:

the valve seat has a cover-like structure, a front end of the cover structure has a block, a first tilt surface is installed at a lower side of the block; a tilt through hole is formed at the first tilt surface; the tilt through hole is communicated with a rear side of the cover structure;

the oil injection tube has a rotary seat and a rear side thereof is formed as a second tilt surface; the tilt surface is formed with a hollow cylinder shaft; in a middle section of the cylinder shaft is a radial hole; a front end of the rotary seat has an inserting hole which is communicated to an interior of the cylinder shaft; thereby, a round tube can be firmly secured to the inserting hole;

wherein the cylinder shaft at the rear end of the rotary seat of the oil injection tube passes through the tilt through hole of the valve seat; the first tilt surface of the block is matched to the second tilt surface of the valve seat so as to be formed as a rotationable structure; then a rear side of the valve seat is firmly secured to a front end of the oil storage tank for sealing the front end; thereby, a grease gun with a rotary oil injection tube is formed.

2. The grease gun with a rotary oil injection tube as claim in claim 1, wherein a rear end of the oil storage tank has an extruding rod, and a periphery of the front end thereof is formed with an outer threaded section for being screwed with the valve seat.

3. The grease gun with a rotary oil injection tube as claim in claim 1, wherein an inner edge of a rear end of the cover structure of the valve seat has an inner threaded section for sealing the oil storage tank.

4. The grease gun with a rotary oil injection tube as claim in claim 1, wherein an upper side of the block is installed with a piston hole which is intersected and communicated with the tilt through hole; a stub hole in the piston hole is communicated with a rear side of the valve seat; a front end of the block is installed with an ear; the ear has a pivotal hole which is a transversal through hole for installing the press rod.

5. The grease gun with a rotary oil injection tube as claim in claim 1, wherein the cylinder shaft of the rotary seat has a plurality of O rings installed at a periphery thereof; an inner threaded section is installed in the rear section; and an elastic washer has a wave-like shape and is locked to a rear end of the shaft of the rotary seat by a stud.

6. The grease gun with a rotary oil injection tube as claim in claim 4, wherein a front section of the press rod is pivotally installed with a supporting rod which is extended to the lower side; a distal end of the supporting rod is installed with a pivotal hole which is penetrated by a pivotal shaft; a body of the press rod at a rear side of the supporting rod is pivotally installed with a plug shaft; thereby, an oil extruding structure by the press rod and valve seat is formed.

7. The grease gun with a rotary oil injection tube as claim in claim 1, wherein the tilt surface of the rotary seat of the oil injection tube is installed with at least one blind hole; an elastic element and a steel ball is installed; a plurality of concave holes are formed at the tilt surface at a front end of the valve seat; when the rotary seat is assembled to the tilt surface of the valve set, the elastic element will eject the steel ball into one of the concave holes so that the oil injection tube can be positioned by the steel ball.

* * * * *